United States Patent [19]

McPherson

[11] Patent Number: 5,783,816

[45] Date of Patent: Jul. 21, 1998

[54] MEASURING DEVICE FOR A HAY BALER

[76] Inventor: Bobby Roy McPherson, 2065 Road 311, New Castle, Colo. 81647

[21] Appl. No.: 728,038

[22] Filed: Oct. 9, 1996

[51] Int. Cl.[6] .................................................. G01D 5/34
[52] U.S. Cl. .......................... 250/231.13; 250/221; 100/4
[58] Field of Search ........................... 250/231.13, 221, 250/216, 206; 100/4, 7, 3, 5, 40, 48; 56/341–343, 433; 414/24.5

[56] References Cited

U.S. PATENT DOCUMENTS

| | | | |
|---|---|---|---|
| 1,868,218 | 7/1932 | Nilsson. | |
| 2,477,059 | 7/1949 | Hill. | |
| 2,989,172 | 6/1961 | Stoll. | |
| 3,028,117 | 4/1962 | Shepley. | |
| 3,854,396 | 12/1974 | Greytak et al. | 100/4 |
| 4,089,482 | 5/1978 | Mooney et al. | 242/58.1 |
| 4,151,403 | 4/1979 | Woolston | 235/92 |
| 4,337,903 | 7/1982 | Kessler et al. | 242/56 |
| 4,358,753 | 11/1982 | Cascini | 250/231.13 |
| 4,563,854 | 1/1986 | Ackerman | 53/118 |
| 4,718,336 | 1/1988 | Munro | 100/3 |
| 4,731,984 | 3/1988 | van der Lely | 100/88 |
| 5,138,942 | 8/1992 | Henderson et al. | 100/88 |
| 5,426,923 | 6/1995 | Underhill | 53/587 |

Primary Examiner—Que Le
Attorney, Agent, or Firm—Macheledt Bales & Johnson LLP; Jennifer L. Bales

[57] ABSTRACT

Hay bale measuring apparatus utilizes two measuring wheels for measuring the string used by the baler, and indicating the amount of string to a control and display unit. The baler operator sets the desired hay bale size and monitors the baler operation on the display. The control and display unit generates a signal which indicates to the baler when it is time to tie off a bale of hay. The measuring wheel includes a plurality of teeth and is used with an optical beam generator and optical beam detector. String is wrapped once around the wheel and turns the wheel as it is pulled by the baler. As the wheel turns, the teeth interrupt the beam from the beam generator, forming a series of bursts of light. The beam detector generates a burst of current coincident with each burst of light, and sends it to the control and display unit. The conventional bale measuring assembly is completely removed and replaced by a mechanical arm, controlled by the control and display module and capable of moving down or pivoting out of the way of the gear dog used to trigger the tying mechanism.

18 Claims, 5 Drawing Sheets

MEASURING DEVICE FOR A HAY BALER

BACKGROUND OF THE INVENTION

1. Field of the Invention

The present invention relates to hay balers. More particularly, the present invention relates to a measuring device to determine bale size for use in hay balers.

2. Description of the Prior Art

Hay balers are complicated mechanical devices designed to pick up previously cut hay in the field, form it into uniform bales, tie the bales, and drop the bales on the ground as the operator drives the hay baler at a reasonably uniform rate of speed. Modern hay balers are extremely complicated, requiring constant maintenance and adjustment to operate properly. One area which becomes uncalibrated particularly quickly are the mechanisms for measuring and forming uniform bales of hay. In addition, hay baler operators don't always know when the string for tying the bales has broken or run out.

A detailed description of the structure and operation of hay balers may be found in many sources. For example, refer to John Deere *Operator Manual OME*81606 (BALER 468), or AGCO Hesston Form Number 700 710 200 (4655 Square Baler). However, a brief discussion of the measuring and tying mechanisms on conventional hay balers will assist in understanding the current invention. FIG. 1 shows a string box 10 containing several balls 12 of string 15. The particular string box 10 shown in FIG. 1 contains six balls of string. The end of one ball of string is tied to the beginning of the next roll, until three rolls are tied together, and the beginning of the first roll is threaded through several eyelet's 13 and a hole 14 before being provided to one of the two tying mechanisms. The other three rolls are similarly tied together, strung through separate eyelet's 13 and the other hole 14, and provided to the other tying mechanism.

FIGS. 2 and 3 show the measuring mechanism used in conventional hay balers. All conventional hay balers use approximately the same measuring mechanism, with some small changes. The measuring mechanism starts out in the configuration shown in FIG. 2, as the hay bale is being formed. Star wheel 44 contacts the top surface of the hay bale being formed. As the hay moves past, star wheel 44 turns counterclockwise, turning a shaft (not shown) connected to metering gear 45. Metering gear 45 causes arc 37 to move upward until the shaft moves into trip notch 40. This allows the measuring assembly to move left and rotate clockwise slightly, rotating trip arm 34 counterclockwise, so that end 32 moves out of contact with dog 31, and reset roller 33 moves out of the way of protrusion 29. Spring loaded gear 20 begins to rotate counterclockwise. This is the configuration shown in FIG. 3

Gear 20 rotates counterclockwise one revolution. As it rotates, lower portion 23 of reset cam 22 forces reset roller 33 to the right, rotating trip arm 34 clockwise. This causes the measuring assembly to rotate clockwise back to its original position shown in FIG. 2. Metering gear 45 stops when it hits stop collar 42. Protrusion 29 on rim 28 moves roller 33 slightly upward, moving end 32 of arm 34 back into position to contact dog 31 and prevent gear 20 from rotating further.

Chain 26 engages with gear teeth 24, and is used to drive the knotting mechanism shown in FIGS. 4A–4F. In some hay balers, chain 26 is replaced by a gear for driving the knotting mechanism. The size of the hay bales is controlled by loosening stop adjustment 43, moving stop collar 42, and retightening stop adjustment 43. This method of determining hay bale size is inherently imprecise, and stop collar 42 is subject to jarring and vibrations which cause it to move while the baler is operating. Thus, hay bales from a short period of baling can vary in size so much they are difficult to stack.

FIGS. 4A through 4F show the bale tying process mechanically triggered by the rotation of gear 20. In FIG. 4A, the bale is being formed, and string 15 is held in string disk 49 by string holder 48. It is fed from string box 10. String 15 feeds down from string holder 49, over billhook 52, through guide 51, over the top of bale. Needle 60 holds the other end of string 15, pulling it around under the bale. In FIG. 4B, needle 60 brings the end of string 15 up through guide 51, and into string disk 49. In FIG. 4C, billhook 52 starts to rotate to the left, forming a loop of string around the hook. In FIG. 4D, billhook jaw 54 opens to receive the string as billhook 52 continues to rotate. In FIG. 4E, billhook jaw 54 closes to pull the knot tight, and knife 56 on knife arm 57 cuts the string. Needle 60 withdraws, pulling string 15 in place for the next bale. In FIG. 4F the severed ends of the string slide out of billhook 52.

A need remains in the art for improved apparatus for measuring hay bales in hay balers.

SUMMARY OF THE INVENTION

An object of the present invention is to provide improved apparatus for measuring hay bales in hay balers.

A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, has an improved measuring and actuating device comprising a string measuring device for measuring movement of the string as it is wrapped around the hay bale being formed and generating a measuring signal based upon the movement of the string, and an actuating device connected to the measuring device for actuating the tying mechanism when the measuring signal reaches a predetermined value.

Generally, the string measuring device comprises a measuring wheel having the string wrapped around it, whereby the wheel rotates as the string moves, and a rotation detecting device for detecting the rotation of the wheel and generating the string measuring signal based upon the rotation of the wheel. More specially, the rotation detecting device comprises a plurality of spaced apart protrusions affixed about the perimeter of said wheel, a beam generator for generating a beam of light parallel to the axis of the wheel and directed at the protrusions, such that the beam of light is periodically interrupted by the protrusions as the wheel turns, and a beam detector aligned with the beam generator and located on the opposite side of the protrusions from the light beam generator for detecting the beam of light and generating the string measuring signal based upon detecting the beam of light.

The measuring and actuating device further includes means for allowing an operator to input and modify the predetermined value, means for providing the measuring signal to the operator, and bale monitoring means for monitoring when the actuating device actuates the tying mechanism, and maintaining a count of the number of times the actuating means actuates the tying mechanism, thereby counting the number of hay bales formed by the hay baler, and providing the count to the operator.

DETAILED DESCRIPTION OF THE PREFERRED EMBODIMENT

Figure 1:
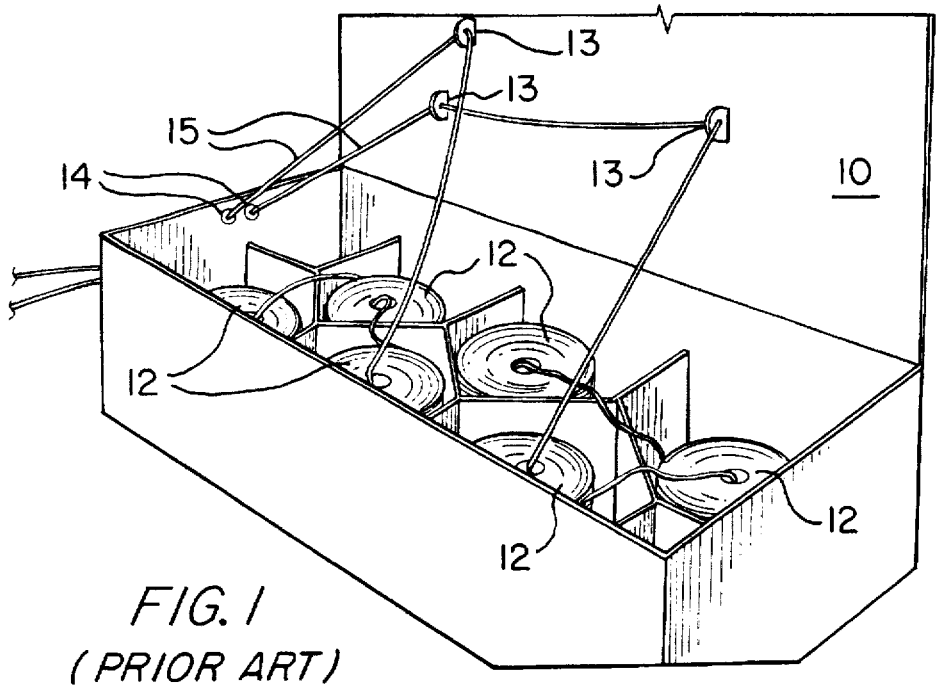
FIG. 1 (prior art) shows a string box for dispensing string to a hay baler.
Figure 2:
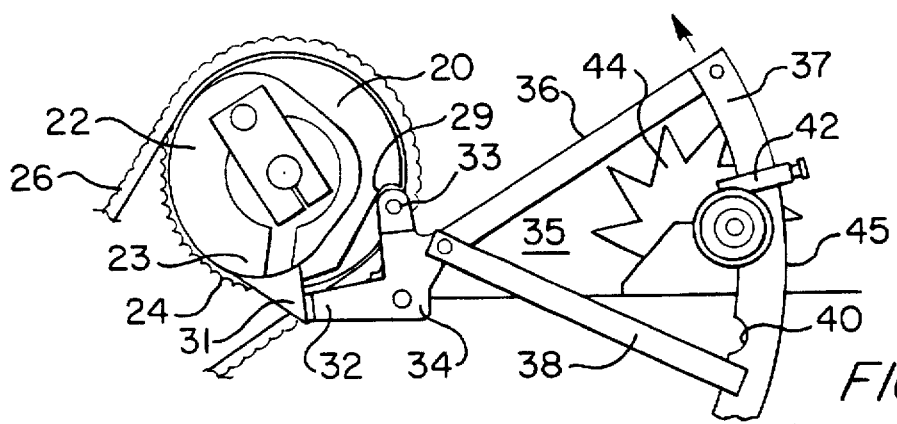
FIG. 2 (prior art) shows the measuring mechanism used in conventional hay balers, while the hay bale is being formed.
Figure 3:
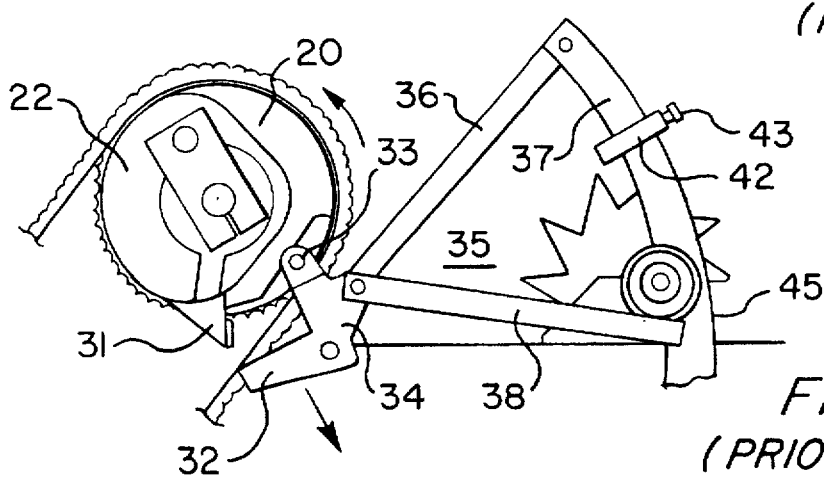
FIG. 3 (prior art) shows the measuring mechanism of FIG. 2, as the hay bale is tied off.
Figure 4A:
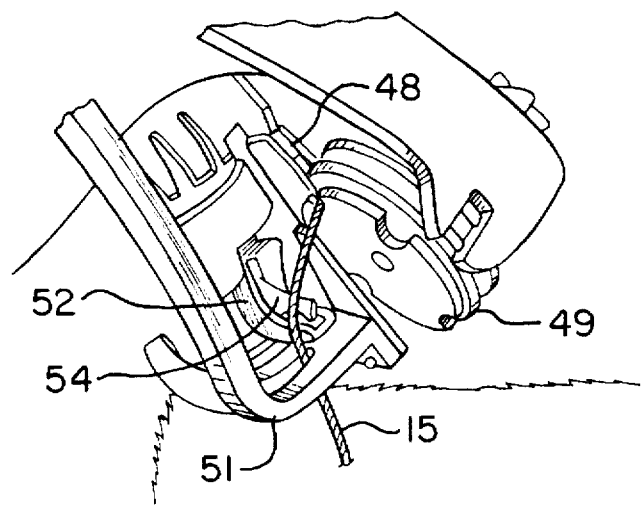
FIGS. 4A, 4B, 4C, 4D, 4E, and 4F prior art) show the bale tying mechanism in conventional hay balers.
Figure 4B:
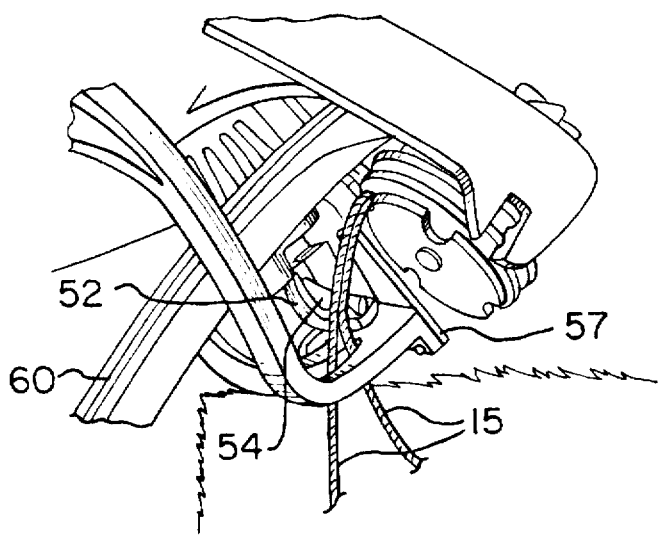
Figure 4C:
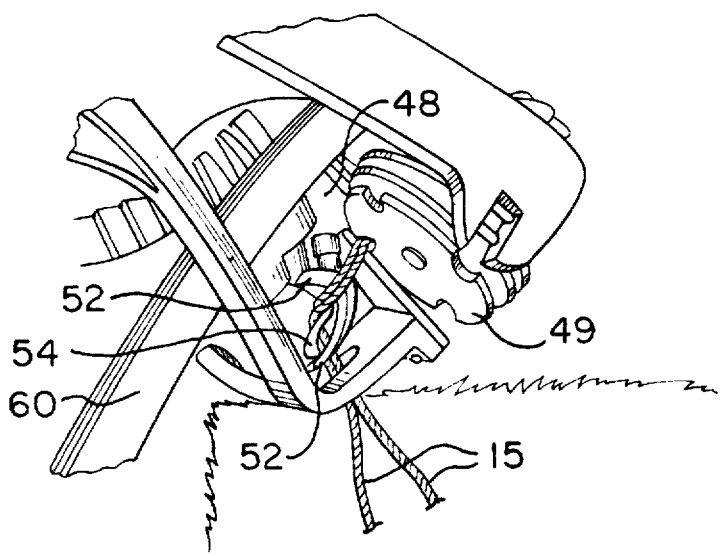
Figure 4D:
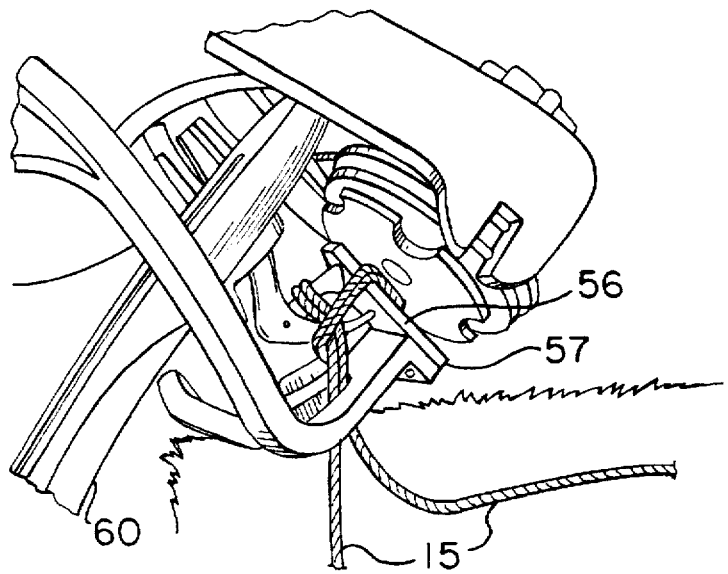
Figure 4E:
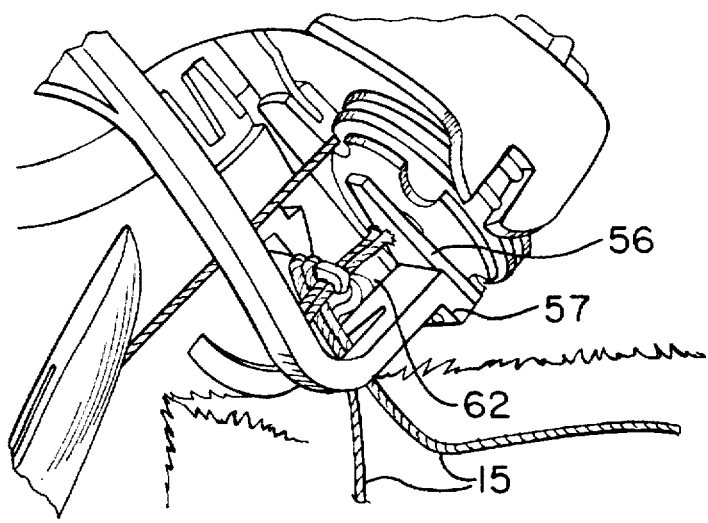
Figure 4F:
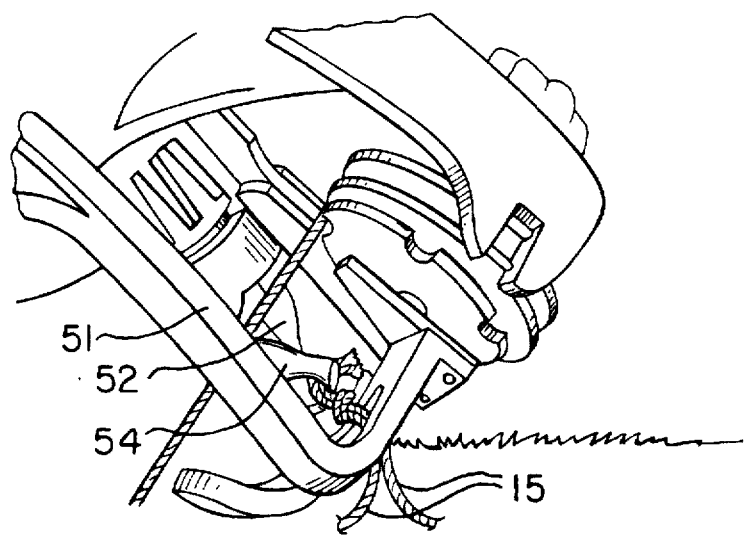
Figure 5:
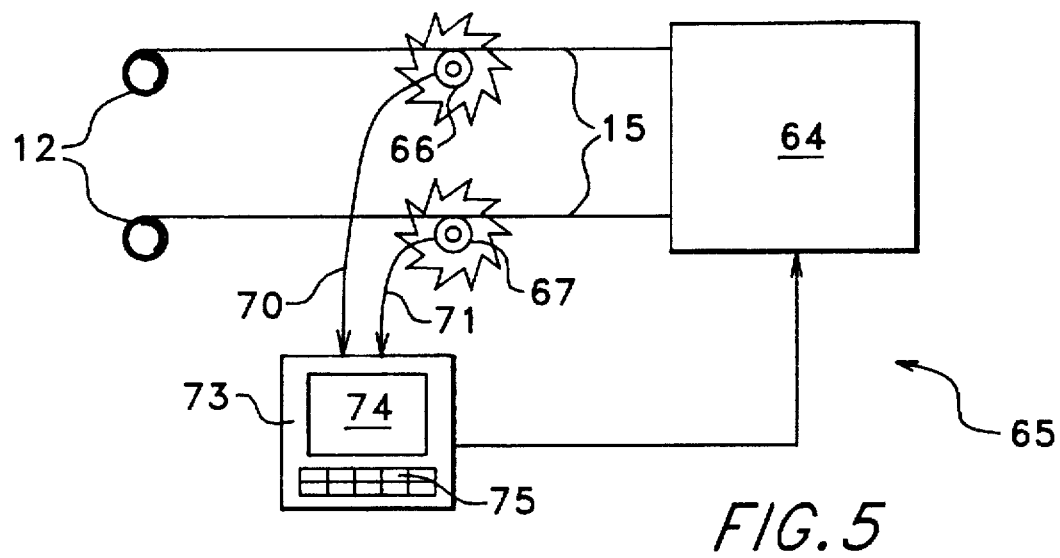
FIG. 5 shows a hay bale measuring apparatus according to the present invention.

FIG. 5 shows the preferred embodiment of hay bale measuring apparatus 65. Measuring apparatus 65 utilizes two measuring wheels 66, 67, for measuring string 15. Signals 70, 71 indicate the amount of string measured by wheels 66, 67 to control and display unit 73. The baler operator sets the desired hay bale size via controls 75, and monitors the baler operation on display 74. Control and display unit 73 also generates signal 77, which indicates to bale former and tying mechanism 64 when it is time to tie off a bale of hay.

Figure 6:
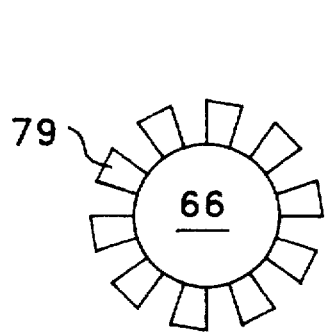
FIG. 6 shows a measuring wheel for use in the measuring apparatus of FIG. 5.
Figure 7:
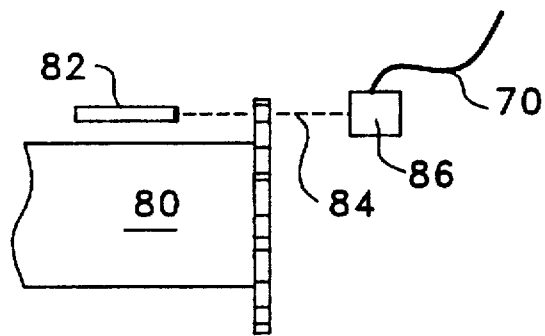
FIG. 7 shows an optical beam generator and detector for use with the measuring apparatus of FIG. 5.

FIG. 6 shows a measuring wheel 66 for use in measuring apparatus 65. Any one of a variety of known methods may be used to measure string 15. In the preferred embodiment, wheel 66 includes a plurality of teeth 79, and is used with an optical beam generator 82 and optical beam detector 86 of FIG. 7. String 15 is wrapped once around wheel 66 and turns wheel 66 as it is pulled by bale former 64. As wheel 66 turns, teeth 79 interrupt the beam from beam generator 82. Thus, beam detector 86 receives a series of bursts of light, the frequency of which is related to how quickly wheel 66 is turning. Thus, if wheel 66 has a circumference of one foot, and has ten teeth 79, each burst of light indicates that one-tenth of a foot of string has been used by hay bale former 64. In the preferred embodiment, beam detector 86 simply generates a burst of current on line 70 coincident with each burst of light.

Measuring wheel 67 may be identical to wheel 66, and have its own beam generator and beam detector for generating signal 71. Or, it may utilize a simpler mechanism which simply indicates on line 71 whether wheel 67 is turning or not. It is not necessary, though it may be desirable, to actually measure the string 15 at wheel 67. What is very important is to ensure that wheel 67 is turning whenever wheel 66 is turning. If one of the two wheels stops turning, then string is only being provided to one end of bale former 64, and proper bales are not being formed.

Figure 8:
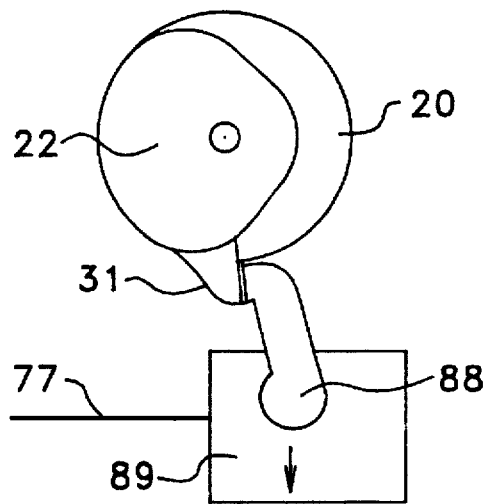
FIG. 8 shows a mechanical arm for triggering the hay bale tying operation, for use with the measuring apparatus of FIG. 5.

FIG. 8 shows how the tying mechanism as shown in FIGS. 4A-E is triggered in the present invention. Conventional measuring assembly 35 is entirely removed. Trip arm 34 is replaced by a mechanical arm 88, capable of moving down or pivoting out of the way of dog 31. The device 89 for moving arm 88 is triggered by signal 77 from control and display module 73. In the preferred embodiment, device 89 comprises a solenoid for using electricity to move arm 88. Arm 88 is biased toward dog 31, so that arm 88 moves back into position in time to prevent gear 20 from rotating more than once. As gear 20 rotates, it triggers the tying mechanism as described above, and shown in FIGS. 4A-E.

Figure 9:
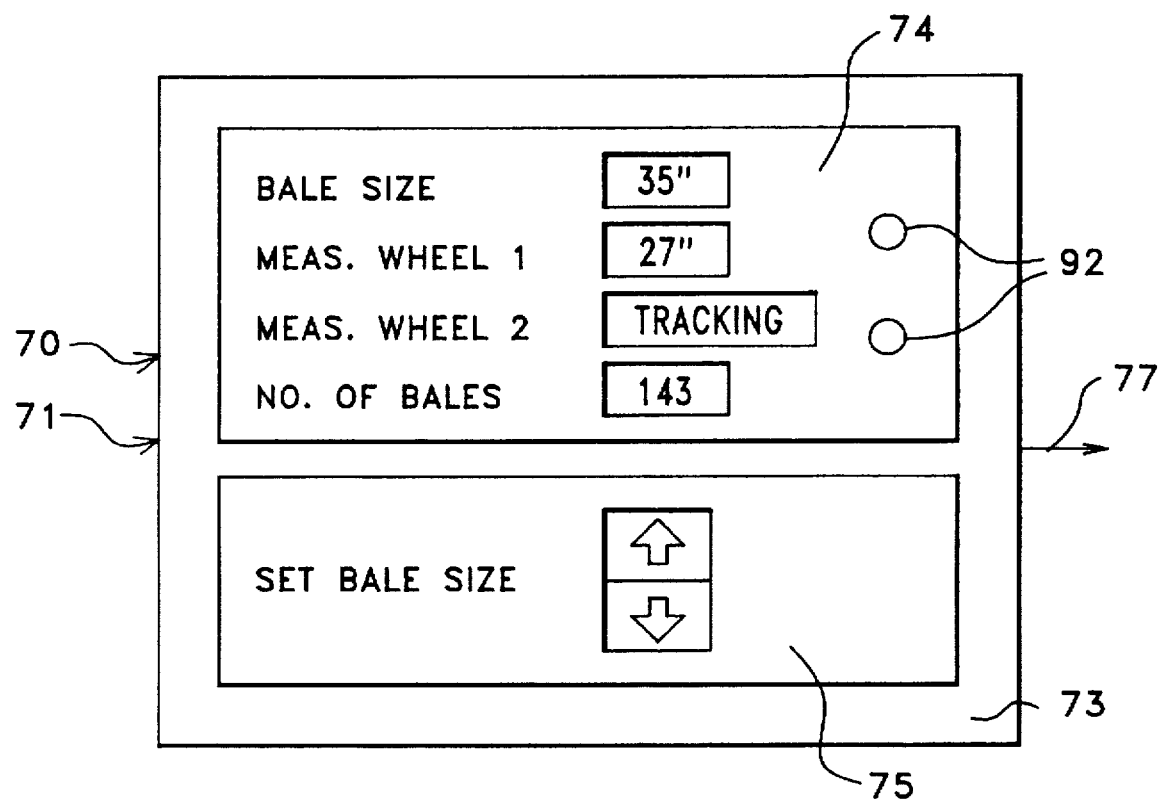
FIG. 9 shows an example of a display for use with the measuring apparatus of FIG. 5.

FIG. 9 shows an example of a control and display module 73 for use with measuring apparatus 65 of FIG. 5. The baler operator sets the desired hay bale size using controls 75. Control and display module 73 counts the bursts of voltage on line 70, and computes the amount of string measured by wheel 66 since the last bale was tied off. When the current hay bale reaches its desired size, signal 77 is generated to trigger the tying mechanism. Control and display module 73 also monitors signal 71 to ensure that wheel 67 is tracking wheel 66.

Displays 74 in the preferred embodiment include the desired bale size, the amount of string measured by wheel 66 for the current bale, a display to indicate whether wheel 67 is tracking wheel 66, a count of the number of bales already formed, and warning lights or buzzers to indicate to the operator that either wheel 66 or wheel 67 has quit turning, indicating that string 15 has run out to that wheel.

While the exemplary preferred embodiments of the present invention are described herein with particularity, those skilled in the art will appreciate various changes, additions, and applications other than those specifically mentioned, which are within the spirit of this invention. For example, magnetic tape or the like integrally formed within string 15 could be directly detected by a magnetic sensor used in place of sensor 86, eliminating the need for wheels 66 and 67.

What is claimed is:

1. A hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, wherein the improvement is an improved measuring and actuating device comprising:

string measuring means for measuring movement of the string as it is wrapped around the hay bale being formed, said measuring means generating an electrical measuring signal based upon the movement of the string; and actuating means connected to the measuring means for actuating the tying mechanism when the electrical measuring signal reaches a predetermined value.

2. The measuring and actuating device of claim 1 wherein the string measuring means comprises:

a measuring wheel having the string wrapped around said wheel whereby the wheel rotates as the string moves; and rotation detecting means for detecting the rotation of the wheel and further for generating said electrical measuring signal based upon the rotation of the wheel.

3. The measuring and actuating device of claim 2 wherein the rotation detecting means comprises:

a plurality of spaced apart protrusions affixed about the perimeter of said wheel;

beam generating means for generating a beam of light parallel to the axis of the wheel and directed at the protrusions, such that the beam of light is periodically interrupted by the protrusions as the wheel turns; and beam detection means aligned with the beam generating means and located on the opposite side of the protrusions from the light beam generating means for detecting the beam of light when said beam is not interrupted, said beam detection means further generating said electrical measuring signal based upon detecting the beam of light.

4. The measuring and actuating device of claim 1, further including means for allowing an operator to input and modify said predetermined value.

5. The measuring and actuating device of claim 4, further including means for providing said electrical measuring signal to the operator.

6. The measuring and actuating device of claim 4, further comprising:

bale monitoring means for monitoring when the actuating means actuates the tying mechanism, said bale monitoring means further maintaining a count of the number of times the actuating means actuates the tying mechanism, thereby counting the number of hay bales formed by the hay baler, said bale monitoring means further providing said count to the operator.

7. A hay baler of the kind having a bale forming mechanism which wraps a first and a second piece of string around each bale as the bale is being formed and a tying mechanism for tying off the formed bales with the pieces of string, and further including a measuring and actuating device for determining when the hay bale being formed has reached a predetermined size and actuating the tying mechanism, wherein the improvement is an improved measuring and actuating device comprising:

first string measuring means for measuring movement of the first piece of string as it is wrapped around the hay bale being formed, said first string electrical measuring means generating a first measuring signal based upon the movement of the first piece of string; and actuating means connected to the first measuring means for actuating the tying mechanism when the first electrical measuring signal reaches a predetermined value.

8. The measuring and actuating device of claim 7 wherein the first string measuring means comprises:

a first measuring wheel having the first piece of string wrapped around said first wheel whereby the first wheel rotates as the first piece of string moves; and first rotation detecting means for detecting the rotation of the first wheel and further for generating said first electrical measuring signal based upon the rotation of the first wheel.

9. The measuring and actuating device of claim 8 wherein the first rotation detecting means comprises:

a plurality of spaced apart protrusions affixed about the perimeter of said first wheel;

beam generating means for generating a beam of light parallel to the axis of the first wheel and directed at the protrusions, such that the beam of light is periodically interrupted by the protrusions as the first wheel turns; and beam detection means aligned with the beam generating means and located on the opposite side of the protrusions from the light beam generating means for detecting the beam of light when said beam is not interrupted, said beam detection means further generating said first electrical measuring signal based upon detecting the beam of light.

10. The measuring and actuating device of claim 8, further including a second string measuring means comprising:

a second measuring wheel having the second piece of string wrapped around said second wheel whereby the second wheel rotates as the second piece of string moves; and second rotation detecting means for detecting the rotation of the second wheel and further for generating a second electrical measuring signal based upon the rotation of the second wheel.

11. The measuring and actuating device of claim 10, further including means for allowing an operator to input and modify said predetermined value.

12. The measuring and actuating device of claim 11, further including means for providing said first and said second electrical measuring signals to the operator.

13. The measuring and actuating device of claim 11, further comprising:

bale monitoring means for monitoring when the actuating means actuates the tying mechanism, said bale monitoring means further maintaining a count of the number of times the actuating means actuates the tying mechanism, thereby counting the number of hay bales formed by the hay baler, said bale monitoring means further providing said count to the operator.

14. In a hay baler of the kind having a bale forming mechanism which wraps string around the bales as they are being formed and a tying mechanism for tying off the formed bales with the string, and further including a measuring and actuating device for determining when the hay bale being formed has reached a predetermined size and actuating the tying mechanism, the method of determining when the hay bale being formed has reached a predetermined size and actuating the tying mechanism comprising the steps of:

measuring movement of the string as it is wrapped around the hay bale being formed;

generating an electrical measuring signal based upon the movement of the string; and actuating the tying mechanism when the electrical measuring signal reaches a predetermined value.

15. The method of claim 14 wherein the measuring step comprises the steps of:

wrapping the string around a measuring wheel whereby the wheel rotates as the string moves; and detecting the rotation of the wheel and generating said electrical measuring signal based upon the rotation of the wheel.

16. The method of claim 15 wherein the detecting step comprises the steps of:

affixing a plurality of spaced apart protrusions about the perimeter of said wheel;

directing a beam of light parallel to the axis of the wheel and directed at the protrusions, such that the beam of light is periodically interrupted by the protrusions as the wheel turns;

detecting the beam of light on the opposite side of the protrusions; and generating said electrical measuring signal based upon detecting the beam of light.

17. The method of claim 14, further comprising the steps of:

monitoring when the actuating means actuates the tying mechanism;

maintaining a count of the number of times the actuating means actuates the tying mechanism; and providing said count to an operator.

18. The method of claim 14, further comprising the step of:

responsive to a command by an operator, modifying the predetermined value.

* * * * *

UNITED STATES PATENT AND TRADEMARK OFFICE
CERTIFICATE OF CORRECTION

PATENT NO. : 5,783,816
DATED : July 21, 1998
INVENTOR(S) : McPherson

It is certified that error appears in the above-identified patent and that said Letters Patent is hereby corrected as shown below:

Column 1, line 32, delete "eyelet's" and insert "eyelets";

Column 1, line 35, delete "eyelet's" and insert "eyelets";

Column 2, line 48, delete "specially" and insert "specifically"; and

Column 3, line 9, before "prior" insert "(".

Signed and Sealed this

Twenty-ninth Day of June, 1999

Attest:

Q. TODD DICKINSON

Attesting Officer        Acting Commissioner of Patents and Trademarks

UNITED STATES PATENT AND TRADEMARK OFFICE
CERTIFICATE OF CORRECTION

PATENT NO. : 5,783,816
DATED : July 21, 1998
INVENTOR(S) : Bobby Roy McPherson

It is certified that error appears in the above-identified patent and that said Letters Patent is hereby corrected as shown below:

<u>Title page,</u>
Item [54], Title, should read -- MEASURING DEVICE TO DETERMINE BALE SIZE FOR USE IN HAY BALERS --.

Signed and Sealed this

Twenty-seventh Day of December, 2005

JON W. DUDAS
*Director of the United States Patent and Trademark Office*